(12) United States Patent
Kato et al.

(10) Patent No.: US 7,670,418 B2
(45) Date of Patent: Mar. 2, 2010

(54) YELLOW INK COMPOSITION, INKSET FOR INKJET, INKJET RECORDING METHOD, AND RECORDED MATTER

(75) Inventors: Shinichi Kato, Matsumoto (JP); Tsuyoshi Sano, Shioziri (JP)

(73) Assignee: Seiko Epson Corporation, Tokyo (JP)

( * ) Notice: Subject to any disclaimer, the term of this patent is extended or adjusted under 35 U.S.C. 154(b) by 51 days.

(21) Appl. No.: 12/074,532

(22) Filed: Mar. 4, 2008

(65) Prior Publication Data

US 2008/0233362 A1    Sep. 25, 2008

(30) Foreign Application Priority Data

Mar. 22, 2007 (JP) ............................. 2007-074406
Dec. 20, 2007 (JP) ............................. 2007-329045

(51) Int. Cl.
*C09D 11/02* (2006.01)
*B41J 2/01* (2006.01)
(52) U.S. Cl. ..................... 106/31.6; 347/100
(58) Field of Classification Search ............... 106/31.6; 347/100
See application file for complete search history.

(56) References Cited

U.S. PATENT DOCUMENTS

| 6,869,470 | B2 * | 3/2005 | Kato ........................... 106/31.6 |
| 7,384,472 | B2 * | 6/2008 | Schweikart et al. .......... 106/496 |
| 2007/0129457 | A1 * | 6/2007 | Nakano et al. ................. 522/1 |
| 2007/0215008 | A1 * | 9/2007 | Schweikart et al. .......... 106/496 |
| 2007/0224345 | A1 * | 9/2007 | Metz et al. ................ 106/31.65 |
| 2008/0173214 | A1 * | 7/2008 | Oyanagi et al. ........... 106/31.25 |
| 2008/0182085 | A1 * | 7/2008 | Oyanagi et al. ........... 428/195.1 |
| 2008/0207805 | A1 * | 8/2008 | Blease et al. ................. 524/145 |
| 2008/0308004 | A1 * | 12/2008 | Deroover et al. .......... 106/31.75 |
| 2009/0110827 | A1 * | 4/2009 | Nakano et al. ............... 427/256 |
| 2009/0142555 | A1 * | 6/2009 | Sano et al. ................ 428/195.1 |

FOREIGN PATENT DOCUMENTS

JP    2005-015813    1/2005

OTHER PUBLICATIONS

Abstract of WO 2007/060264, May 2007.*
Patent Abstracts of Japan of JP 2005-015813 dated Jan. 20, 2005.

* cited by examiner

*Primary Examiner*—Helene Klemanski
(74) *Attorney, Agent, or Firm*—Ladas and Parry LLP

(57) ABSTRACT

A yellow ink composition for inkjet recording, containing one or more pigments selected from a group consisting of C. I. Pigment Yellow 213, 185, and 155 as a colorant.

6 Claims, No Drawings

YELLOW INK COMPOSITION, INKSET FOR INKJET, INKJET RECORDING METHOD, AND RECORDED MATTER

CROSS-REFERENCES TO RELATED APPLICATIONS

The entire disclosure of Japanese Patent Application No. 2007-074406, filed on Mar. 22, 2007 and Japanese Patent Application No. 2007-329045, filed on Dec. 20, 2007, is expressly incorporated by reference herein.

BACKGROUND

1. Technical Field

The present invention relates to a yellow ink composition used in an inkjet printing method, an inkset for inkjet printing that contains the yellow ink composition, an inkjet recording method, and recorded matter.

2. Related Art

In recent years, much attention has focused on the inkjet recording method. The inkjet recording method is a printing method where printing is performed by discharging an ink composition as small droplets, and these small droplets adhere to a recording medium such as paper or the like. This method has the characteristics of enabling high-speed printing of a high-resolution high quality image using a relatively inexpensive device. Furthermore, inkjet recording devices that use this method have wide acceptance in the market because of the excellent printing quality, low cost, relatively quiet operation, and excellent graphics capability. Of these devices, thermal (bubblejet (registered trademark)) and piezoelectric drop on demand printers in particular have been commercially successful, and are widely used as printers for personal computers at the office and home.

Furthermore, in recent years, printed matter has been obtained by forming a color image using an inkjet recording method that uses a plurality of color ink compositions. Generally, formation of a color image is performed using three colors, namely a yellow ink composition, a magenta ink composition, and a cyan ink composition, or if desired, using four colors by adding a black ink composition. Furthermore, color images are also formed using six colors with the addition of a light cyan ink composition and a light magenta ink composition to the aforementioned four colors, or using seven colors by also adding a dark yellow ink composition. Combinations of two or more of these ink compositions are referred to as an inkset.

The ink compositions which are used in forming the aforementioned color image are required to have good coloring properties for the individual color of each ink composition, as well as the capability to create favorable intermediate colors when a plurality of ink compositions are combined, and the recorded matter obtained thereby must not discolor when stored.

Furthermore, in recent years, continuous improvements have been made in the printhead, in the composition, recording method, and media in order to achieve "picture quality" printing using a color inkjet printer, and the picture quality obtained is similar to a photograph and at a level indistinguishable from a "silver chloride photograph". On the other hand, efforts are underway to improve the storage properties of the images of recorded matter obtained using a color inkjet printer by improving the ink compositions and the media, and in particular the light fastness of the image has been improved to a practical level.

However, degradation of the image occurs not only because of the effect of light, but also because of oxidation due to oxidative gases existing in the environment such as ozone, and water (humidity) in the environment, and therefore discoloration and fading of the image will proceed. Therefore, in order to further increase the storage properties of the image on recorded matter, it is desirable that the light fastness of the image that is formed by the ink composition be improved, in addition to improving the ozone resistance and the humidity resistance. Therefore, various investigations have been performed in order to improve the light fastness, ozone resistance, and humidity resistance of the inkjet recorded matter (refer to JP-A-2005-15813).

In an inkset, if the light fastness and the like of a specific ink composition are noticeably inferior to the light fastness and the like of the other ink compositions, the color formed by that specific ink composition will fade and discolor faster than the other colors, and the color balance of the entire image will be poor. Therefore, an observer will be aware of the degradation in the picture quality of the image in a shorter period of time than they could be aware of fading of an image formed by only one ink composition. Therefore, with an inkset, in addition to improving the light fastness and the like of each of the ink compositions which form the inkset, preferably the level of the light fastness and the like of each of the ink compositions, or in other words the degradation speed and the fading speed of an image formed by each of the ink compositions due to light, ozone, and water will preferably be as similar as possible. In other words, the light fastness and the like of each of the ink compositions that make up the inkset should be excellent, and preferably the difference in the light fastness and the like of each ink compositions will be small.

When considering the use of a pigment as a colorant for the ink for inkjet recording, a pigment has excellent light fastness and water resistance, but on the other hand, the number of types of colorant that can be used will be less than with a dye. When actually used as an ink for inkjet recording, there is a need to sufficiently investigate the balance between light fastness and chromaticity. Furthermore, when used as an inkset, in addition to improving the light fastness and chromaticity of each of the ink compositions which compose the inkset, the balance between light fastness and chromaticity between the individual ink compositions which compose the inkset must also be considered.

SUMMARY

Therefore, an advantage of one aspect of the invention is the ability to provide a yellow ink composition that has overall excellent light fastness, chromaticity, and storage stability. Furthermore, another advantage of one aspect of the invention is the ability to provide an inkset with excellent balance for light fastness and chromaticity between the various ink compositions which compose the inkset, as well as an inkjet recording method that uses this inkset, and recorded matter that is recorded using this inkjet recording method.

The present inventors have discovered that a yellow ink composition that contains a specific pigment can achieve a favorable image when used with a color inkjet recording method. Furthermore, the inventors have discovered that an image with favorable color balance can be achieved by using this yellow ink composition together with a specific color ink composition. Based on these findings, one advantage of the present invention is the ability to provide a yellow ink composition for inkjet recording that contains at least one pigment selected from a group consisting of C. I. Pigment Yellow 213, 185, and 155 as a colorant.

Furthermore, one aspect of the invention is an inkset for inkjet recording, having a yellow ink composition, a cyan ink composition, a magenta ink composition, and a black ink composition, and provides an inkset for inkjet printing wherein the yellow ink composition is the aforementioned yellow ink composition; the cyan ink composition contains phthalocyanine pigment; the magenta ink composition contains quinacridone pigment; and the black ink composition contains carbon black.

In addition, the invention provides an inkjet recording method, having: discharging droplets of an ink composition, and causing the droplets to adhere to the recording medium for printing, wherein the aforementioned yellow ink composition or one of the aforementioned inksets are used as the ink composition.

Furthermore, another advantage of the present invention is the ability to provide recorded matter that has been printed using the aforementioned ink jet recording method.

The light fastness, chromaticity, and storage stability overall can be improved by using the yellow ink composition of the present invention. Therefore, an inkset for inkjet printing, an inkjet recording method, and recorded matter that use this yellow ink composition will have excellent balance between the yellow ink composition and other color ink compositions, and image degradation due to changes over years can be improved.

DESCRIPTION OF THE EXEMPLARY EMBODIMENTS

Ink Composition

The yellow ink composition for inkjet recording according to the invention contains at least one type of pigment selected from a group consisting of C. I. Pigment Yellow 213, 185, and 155.

Colorant

The yellow ink composition containing as a colorant at least one pigment selected from a group consisting of C. I. Pigment Yellow 213, 185, and 155 (hereinafter simply referred to as "yellow ink composition") will have excellent overall light fastness, chromaticity, and storage stability. Therefore, the composition is suitable as an ink for inkjet recording.

According to one aspect of the invention, the amount of pigment included in the yellow ink composition can be appropriately decided, but a range between 0.5 and 15 wt % is preferable, a range between 1 and 10 wt % is more preferable, and a range between 2 and 8 wt % is even more preferable.

Furthermore, the average particle size of the aforementioned pigment is preferably between 1 and 300 nm, from the perspective of increasing chromaticity.

Dispersing Agent

The yellow ink composition according to one aspect of the invention preferably contains a dispersing agent in order to stabilize the pigment dispersion. The dispersing agent can be either a water soluble polymer or a surfactant as described later.

Examples of the aforementioned water soluble polymer include water-soluble polymers with ionic hydrophilic groups such as an alkali metal salt, ammonium salt, inorganic acid salt, or organic acid salt of a sulfonate group, carbonate group, or amino group and the like, and these compounds can be used individually or as a blend of two or more types.

Specific examples include cellulose derivatives such as carboxymethylcellulose salt and viscose; natural polymers such as alginate salts, gelatin, albumin, casein, Arabian gum, gum traganth, and lignin sulfonate; starch derivatives such as cationic starch, starch phosphate, and carboxymethyl starch; and condensed polymers such as polyacrylate, polyvinyl sulfate, poly(4-vinylpyridine) salt, polyamide, polyallylamine salt, condensed naphthalene sulfonate, styrene-acrylate copolymer, styrene-methacrylate copolymer, acrylate ester-acrylate copolymer, acrylate ester-methacrylate copolymer, methacrylate ester-acrylate copolymer, methacrylate ester-methacrylate copolymer, styrene-itaconate copolymer, itaconate ester-itaconate copolymer, vinylnaphthalene-acrylate copolymer, vinylnaphthalene-methacrylate copolymer, and vinylnaphthalene-itaconate copolymer and the like. Of these, ammonium salts of styrene-acrylate copolymers are preferably used.

These water-soluble polymers preferably have a weighted average molecular weight between 2000 and 1,000,000. If the weighted average molecular weight is 2000 or more, the abrasion resistance of the image can be improved. If the weighted average molecular weight is 1,000,000 or less, the viscosity of the ink can easily be in a range that can be discharged using an inkjet printing method.

Furthermore, if a water-soluble polymer is used, the amount that is added is preferably in a range between 0.01 and 20 wt % of the total amount of ink. If the amount added is 0.01 wt % or more, the abrasion resistance of the image can be improved. If the weighted average molecular weight is 20 wt % or less, the viscosity of the ink can easily be in a range that can be discharged using an inkjet printing method.

Furthermore, the dispersing agent can be a commercially available product, and specific examples include Johncryl 61J (molecular weight 10,000, acid value 195), Johncryl 68 (molecular weight 10,000, acid value 195), Johncryl 450 (molecular weight between 10,000 and 20,000, acid value 100), Johncryl 55 (molecular weight 7500, acid value 200), Johncryl 555 (molecular weight 5000, acid value 200), Johncryl 586 (molecular weight 3100, asset value 105), Johncryl 680 (molecular weight 3900, acid value 215), Johncryl 682 (molecular weight 1600, acid value 235), Johncryl 683 (molecular weight 7300, acid value 150), and B-36 (molecular weight 6800, acid value 250) and the like manufactured by Johnson Polymer Corporation. Note, the molecular weight shown is the weighted average molecular weight.

The ink preferably contains between 0.1 and 10 wt %, more preferably between 0.3 and 6 wt % of the dispersing agent, converted to solid content, based on the aforementioned pigment.

Furthermore, the yellow composition of this embodiment can also use a so-called surface treated pigment (self dispersing pigment) where a group that directly provides dispersing properties is chemically incorporated onto the surface of the pigment particles, in place of the aforementioned pigment and dispersing agent.

Penetration Enhancer

The yellow ink composition of this embodiment preferably contains a penetration enhancer in order to increase the wetting properties towards the recording medium and to enhance the penetration of the organic pigment. Examples of the penetration enhancer include: various surfactants such as cationic surfactants, anionic surfactants, and nonionic surfactants; alcohols such as methanol, ethanol, and isopropanol; low level alkyl ethers of polyhydric alcohols such as ethylene glycol monomethyl ether, diethylene glycol monoethyl ether, diethylene glycol monobutyl ether, try ethylene glycol monobutyl ether, propylene glycol monobutyl ether, and propylene glycol monobutyl ether; and 1,2-alkanediols such as 1,2-pentenediol and 1,2-hexanediol and the like. One or more of these compounds can be used. In particular, the use of 1,2-alkanediols is preferable.

The amount of the aforementioned penetration enhancer in the yellow ink composition is preferably in a range between approximately 0.1 and 20 wt %, more preferably in a range between approximately 3 and 15 wt %.

Other preferable examples of a penetrating agent include the polyether modified organosiloxane compounds shown by the following general formula 1.

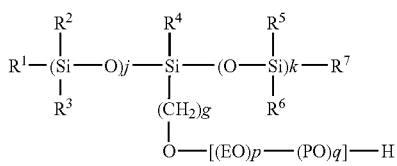

Formula 1

(Where $R^1$ through $R^7$ independently represent $C_{1-6}$ alkyl groups, j, k, and g independently represent integers 1 or higher, EO represents an ethylene oxide group, PO represents a propylene oxide group, and p and q represent integers 0 or higher where p+q is an integer 1 or higher, and EO and PO can be random or block, in any order within the brackets [ ].)

The aforementioned 1,2-alkanediol are those with between 4 and 6 carbon atoms, and examples include 1,2-butanediol, 1,2-pentanediol, and 1,2-hexanediol, but 1,2-pentanediol, and 1,2-hexanediol are preferable, and 1,2-hexanediol is particularly preferable. These compounds can be used individually or as a combination of two or more types.

The amount of 1,2-alkanediol added to the ink composition is preferably in a range between approximately 0.1 and 20 wt %, more preferably in a range between approximately 3 and 15 wt %, and even more preferably in a range between approximately 5 and 10 wt %.

Furthermore, in the polyether modified organosiloxane compounds expressed by the aforementioned general formula 1, $R^1$ through $R^7$ individually represent an alkyl group with between 1 and 6 carbon atoms, and preferably represent a methyl group. j, k, and g individually represent integers 1 or higher, but more preferably are either 1 or 2. Furthermore, p and q represent integers 0 or higher, but p+q is an integer 1 or higher.

In the polyether modified organosiloxane compounds expressed by the aforementioned general formula 1, examples of more preferable compounds are those compounds that satisfy the condition j=k+1, and those compounds where $R^1$ through $R^7$ are all methyl groups, j is 2, k is 1, g is 1, p is an integer 1 or higher, and q is 0.

The compound showed in the aforementioned formula 1 is commercially available, and these products can be used. For example, the silicon surfactants BYK-345, BYK-346, BYK-347, and BYK-348 manufactured by Big Chemy Japan Co., Ltd. can be used.

The amount of polyether modified organosiloxane compound added can be suitably determined, but is preferably in a range between approximately 0.01 and 5 wt %, more preferably in a range between approximately 0.1 and 1 wt %, and even more preferably in a range between approximately 0.3 and 0.5 wt %.

Examples of other preferable penetrating agents include low-level alkyl ethers (glycol ethers) of polyhydric alcohols and/or acetylene glycol surfactants expressed by the following general formula 2.

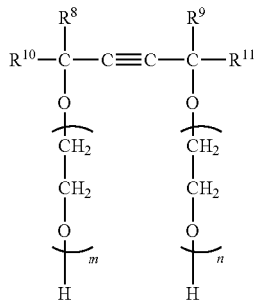

Formula 2

(Where $0 \leq m+n \leq 30$, and $R^8$ through $R^{11}$ independently represent a $C_{1-6}$ alkyl group.)

The amount of polyhydric alcohol low level alkyl ether added is preferably between 1 and 30 wt %, more preferably between 5 and 20 wt %.

The acetylene glycol surfactant expressed by the aforementioned general formula 2 can be a commercially available product, and specific examples include Surfinol 104, 82, 465, 485, or TG (all available from Air Product and Chemicals, Inc.), and Olfine STG and Olfine E1010 (product name, manufactured by Nissin Chemical Industry Co., Ltd).

The amount of acetylene glycol surfactant added can be decided as suitable, but is preferably in a range between 0.01 and 5 wt %, and more preferably in a range between 0.1 and 1 wt %, based on the ink composition.

Wetting Agent

The yellow ink composition of the present embodiment preferably contains a wetting agent from the perspective of preventing plugging of the inkjet printer nozzles. Examples of wetting agents include glycerin, ethylene glycol, diethylene glycol, triethylene glycol, tetraethylene glycol, propylene glycol, dipropylene glycol, tripropylene glycol, polyethylene glycol with a molecular weight of 2000 or lower, 1,3-propylene glycol, isopropylene glycol, isobutylene glycol, 1,4-butenediol, 1,3-butanediol, 1,5-pentenediol, 1,6-hexanediol, mesoerythritol, pentaerythritol, and other polyhydric alcohols, but glycerin is preferable.

The amount of wetting agent added can be decided as suitable, but is preferably in a range between approximately 1 and 30 wt %, based on the ink composition.

Water

The remaining portion of the yellow ink composition of the present embodiment is water. The water is preferably pure water or ultrapure water such as ion exchange water, ultrafiltration water, reverse osmosis water, or distilled water. In particular, water that has been sterilized by ultraviolet light radiation or by adding hydrogen peroxide or the like is preferable because growth of mold and bacteria can be prevented for a long period of time.

Other Components

Furthermore, other materials selected from a pH adjusting agent such as triethanolamine or an alkali metal hydroxide, water-soluble polymer such as sodium alginate, a water soluble resin, a fluoride based surfactant, a preservative, an antifungal agent, a rust inhibitor, a dissolving auxiliary agent, an antioxidant, and an ultraviolet light absorber and the like can also be added if desired to the yellow ink composition of the present embodiment. These components can be used individually, or as a blend of two or more. Furthermore, these components do not need to be added if there is no need. A person skilled in the art can use a preferred amount of a selected additive to the extent that the effect of the present invention is not hindered. The forementioned dissolving aid is an additive for dissolving insoluble materials and maintaining the ink composition in a uniform solution, when an insoluble material is deposited from the ink composition.

Inkset for Inkjet Printing

Furthermore, the inkset for inkjet printing, having a yellow ink composition, a cyan ink composition, a magenta ink composition, and a black ink composition, and provides an inkset for an inket wherein the yellow ink composition is the aforementioned yellow ink composition; the cyan ink composition contains phthalocyanine pigment; the magenta ink composition contains quinacridone pigment; and the black ink composition contains carbon black.

As described above, the yellow ink composition that is used with the invention is overall superior with regards to light fastness, chromaticity, and storage stability. Furthermore, the inkset for inkjet printing that contains this yellow ink composition will also have excellent fading balance between the yellow ink composition and the other color ink compositions, and therefore degradation of an image due to changes over the years can effectively be prevented.

Examples of the phthalocyanine pigment in the aforementioned cyan ink composition include C. I. Pigment Blue 1, 2, 3, 15:3, 15:4, 15:30 4, 16, 22, 60, and C. I. Bat Blue 4, and 60 and the like. These pigments can be used individually or as a combination of two or more types.

Examples of a quinacridone pigment included in the magenta ink composition include C. I. Pigment Red 5, 7, 12, 48 (Ca), 48 (Mn), 57 (Ca), 15:1, 112, 122, 123, 168, 184, 202, 209, and C. I. Pigment Violet 19 and the like. These pigments can be used individually or as a combination of two or more types.

The amount of phthalocyanine pigment and quinacridone pigment in the ink composition can be suitably changed depending on the type of ink composition such as a light or dark ink composition. In particular, the amount of pigments in a light ink composition is preferably between 0.1 and 1.3 wt %, and more preferably in a range between 0.4 and 1.0 wt %.

The aforementioned black ink composition preferably uses at least two or more types of black ink compositions with different concentrations of carbon black. Specifically, at least one type and preferably two or more types of black ink compositions are used, selected from black compositions with a carbon black concentration of 1.5 wt % or higher, gray compositions with a carbon black concentration below 1.5 wt % but no less than 0.6 wt %, and light gray compositions with a carbon black concentration below 0.6 wt %.

The resulting effects include that a high quality monochrome image can be achieved by using a plurality of black ink compositions with different pigment concentrations, tone will be good in areas with low brightness, the gray balance will be stable, and variation will be reduced.

Inkjet Recording Method

The inkjet recording method of the present invention provides an inkjet recording method, having discharging droplets of an ink composition, and printing by causing the droplets to adhere to the recording medium, wherein the aforementioned yellow ink composition or inkset is used as the ink composition.

The method described below is suggested as a method for discharging the ink composition.

A first method is an electrostatic aspiration method, and is a system of applying a strong electric field between a nozzle and an acceleration electrode placed in front of the nozzle, continuously discharging droplets of ink from the nozzle, and while the ink droplets are traveling between the deflecting electrodes, applying a printing information signal to the deflecting electrode, and recording, or a system of discharging ink droplets corresponding to the printing information signal without deflection.

A second method is a method that of forcefully discharging ink droplets by mechanically vibrating the nozzle using a water crystal oscillator while applying pressure on the ink solution using a small pump. The ink droplets that are discharged are electrically charged while being discharged, a printing information signal is applied to a deflecting electrode while the ink droplets are traveling between the deflection electrodes.

A third method is a system that uses a piezoelectric element, where recording is performed by simultaneously applying pressure and printing information signal to the ink solution using a piezoelectric element, discharging the ink droplets.

A fourth method is a method where the ink solution is suddenly expanded in volume by the effect of thermal energy, and uses a system where recording is performed by heating an ink solution to form bubbles using an ultra small electrode in accordance with a printing information signal, and discharging the ink droplets.

The inkjet recording method that uses the ink composition of the present embodiment can be any of the aforementioned methods.

With the inkjet recording method of this embodiment, by using the aforementioned yellow ink composition or inkset, a conventionally used inkjet recording device can be used as is without adding additional equipment, recorded matter with an excellent balance for light fastness and chromaticity can be obtained, and the image will have enhanced storage stability.

Recorded Matter

The recorded matter of this embodiment is made by using at least the aforementioned yellow ink composition or inkset to record on a recording medium. By using the aforementioned ink composition or inkset, recorded matter can be obtained using a conventionally used inkjet recording device as is without adding additional equipment, an excellent balance for light fastness and chromaticity can be obtained, and the image will have storage stability.

Embodiment 1

1. Preparing the Ink Composition

The pigment and an ammonium salt of a styrene-acrylic acid copolymer (molecular weight 10,000, polymer components 38%: dispersing agent) were dispersed for 2 hours in a sand mill (manufactured by Yasukawa Seisakusho) filled with glass beads (diameter 1.7 mm, 1.5 times the amount of blend). Next, the glass beads were removed, other additives were added, and mixing was performed for 30 minutes at ambient temperature. The solution was then filtered using a 5 µm membrane filter to obtain the ink compositions shown below in Table 1. The units are in wt % unless otherwise specifically noted.

TABLE 1

| Ink Composition | Yellow Ink | | | | | | | |
|---|---|---|---|---|---|---|---|---|
| | Y1 | Y2 | Y3 | Y4 | Y5 | Y6 | Y7 | Y8 |
| P.Y.213 | 4 | | | | | | | |
| P.Y.185 | | 4 | | | | | | |
| P.Y.155 | | | 4 | | | | | |
| P.Y.74 | | | | 4 | | | | |
| P.Y.128 | | | | | 4 | | | |
| P.R.122 | | | | | | | | |
| P.B.15:3 | | | | | | | | |
| P.Y.109 | | | | | | 4 | | |
| P.Y.110 | | | | | | | 4 | |
| P.Y.154 | | | | | | | | 4 |
| Carbon black | | | | | | | | |
| Dispersing agent | 5 | 5 | 5 | 5 | 5 | 5 | 5 | 5 |
| Glycerin | 12 | 12 | 13 | 13 | 13 | 12 | 12 | 12 |
| 2-pyrrolidone | 2 | 2 | 2 | 2 | 2 | 2 | 2 | 2 |
| 1,2-hexanediol | 6 | 6 | 6 | 6 | 6 | 6 | 6 | 6 |
| BYK 348 | 0.4 | 0.4 | 0.4 | 0.4 | 0.4 | 0.4 | 0.4 | 0.4 |
| Proxel XL2 | 0.3 | 0.3 | 0.3 | 0.3 | 0.3 | 0.3 | 0.3 | 0.3 |
| Ion exchange water | Balance | Balance | Balance | Balance | Balance | Balance | Balance | Balance |

| Ink Composition | Megenta Ink | | Cyan Ink | | Black Ink | | |
|---|---|---|---|---|---|---|---|
| | M | Lm | C | Lc | Bk | Gray | Light gray |
| P.Y.213 | | | | | | | |
| P.Y.185 | | | | | | | |
| P.Y.155 | | | | | | | |
| P.Y.74 | | | | | | | |
| P.Y.128 | | | | | | | |
| P.R.122 | 4 | 1 | | | | | |
| P.B.15:3 | | | 2 | 0.6 | | | |
| P.Y.109 | | | | | | | |
| P.Y.110 | | | | | | | |
| P.Y.154 | | | | | | | |
| Carbon black | | | | | 2 | 1 | 0.5 |
| Dispersing agent | 5 | 1.5 | 3 | 1 | 3 | 2 | 1 |
| Glycerin | 12 | 16 | 13 | 17 | 13 | 17 | 20 |
| 2-pyrrolidone | 2 | 2 | 2 | 2 | 2 | 2 | 2 |
| 1,2-hexanediol | 6 | 6 | 5 | 5 | 4 | 6 | 6 |
| BYK 348 | 0.5 | 0.5 | 0.5 | 0.5 | 0.4 | 0.4 | 0.4 |
| Proxel XL2 | 0.3 | 0.3 | 0.3 | 0.3 | 0.3 | 0.3 | 0.3 |
| Ion exchange water | Balance | Balance | Balance | Balance | Balance | Balance | Balance |

Note, in Table 1, the carbon black is carbon black MA 7 manufactured by Mitsubishi Chemical Corporation, and the dispersing agent was Johncryl 61J (polymer component 30.5%) manufactured by Johnson Polymer Corporation. Furthermore, BYK 348 refers to a silicon surfactant manufactured by Big Chemy Japan Co., Ltd, and Proxel XL2 refers to a preservative or an anti-molding agent manufactured by AVECIA.

2. Constructing the Inkset

The ink compositions obtained as described above were combined as shown in the following table to form inksets.

TABLE 2

| | Yellow ink | Magenta ink | | Cyan ink | | Black ink | | |
|---|---|---|---|---|---|---|---|---|
| Embodiment 1 | Y1(PY213) | M | Lm | C | Lc | Bk | Gray | Light gray |
| Embodiment 2 | Y2(PY185) | M | Lm | C | Lc | Bk | Gray | Light gray |
| Embodiment 3 | Y3(PY155) | M | Lm | C | Lc | Bk | Gray | Light gray |
| Reference example 1 | Y4(PY74) | M | Lm | C | Lc | Bk | Gray | Light gray |
| Reference example 2 | Y5(PY128) | M | Lm | C | Lc | Bk | Gray | Light gray |

TABLE 2-continued

| | Yellow ink | Magenta ink | | Cyan ink | | Black ink | | |
|---|---|---|---|---|---|---|---|---|
| Reference example 3 | Y6(PY109) | M | Lm | C | Lc | Bk | Gray | Light gray |
| Reference example 4 | Y7(PY110) | M | Lm | C | Lc | Bk | Gray | Light gray |
| Reference example 5 | Y8(PY154) | M | Lm | C | Lc | Bk | Gray | Light gray |

3. Evaluation Test (1) Evaluation 1: Light Fastness

The color ink compositions from the inksets shown in 2 above were added into an ink cartridge, the black ink composition was added to a genuine cartridge, and printing was performed on Epson photograph paper (manufactured by Seiko Epson Corp.) using an inkjet printer PX-5500 (manufactured by Seiko Epson Corp.)

The printing pattern was a solid image of size 10 mm×10 mm with an OD value of 1.0. The printing mode was selected to be "no color correction" for the printer color adjustment in high detail mode for Epson photograph paper. The print sample that was created was exposed for 400 hours and 600 hours at an intensity of 70,000 Lux using a Xenon weather meter XL75 manufactured by Suga Test Instruments Co., Ltd., and then the OD value was measured. Furthermore, the reduction ratio in the OD value after exposure was determined using the OD value before exposure as a standard, and the light fastness of the print sample was evaluated based on the following evaluation criteria. The results are shown in Table 3.

A: Reduction ratio of OD value less than 20%
B: Reduction ratio of OD value 20% or higher but less than 30%
C: Reduction rate of OD value 30% or higher (2) Evaluation 2: Chromaticity (Chroma)

Based on the RGB color mode of Adobe Photoshop (registered trademark), a yellow patch with RGB values of R=255, G=255, B=0, a red patch with values of R=255, G=0, B=0, and a green patch with values of R=0, G=255, B=0 were printed in the same printing mode as in (1) above. After drying the print sample at ambient temperature for one day, the a* and b* of the patch was measured, and C* was calculated using the following equation. The chroma of each color was compared from the C* obtained using the following evaluation criteria. The results are shown in Table 3.

$$C^* = [(a^*)^2 + (b^*)^2]^{1/2}$$

The yellow chroma was evaluated by the following criteria.
A: $C^* > 105$
B: $100 < C^* < 105$
C: $100 \geq C^*$ The red chroma was evaluated by the following criteria.
A: $C^* > 90$
B: $80 > C^* < 90$
C: $80 \geq C^*$ The green chroma was evaluated by the following criteria.
A: $C^* > 80$
B: $70 < C^* < 80$
C: $70 \geq C^*$

TABLE 3

|  | (1) Light fastness | | (2) Chromaticity (Chroma) | | |
| --- | --- | --- | --- | --- | --- |
|  | 400 hours | 600 hours | Yellow | Red | Green |
| Embodiment 1 | A | A | A | B | A |
| Embodiment 2 | A | B | A | A | A |
| Embodiment 3 | A | B | A | B | A |
| Reference example 1 | B | C | A | A | A |
| Reference example 2 | A | A | B | B | B |
| Reference example 3 | A | B | B | B | B |
| Reference example 4 | A | A | A | A | C |
| Reference example 5 | A | A | C | C | B |

(3) Evaluation 3: Storage Stability

The yellow pigment inks Y1 through Y8 were placed in sealable storage bottles, and allowed to sit for three weeks at 60° C. The rate of change in the particle size before and after storage is shown in Table 4. Furthermore, storage stability was based on the following evaluation standard.

A: Change in the particle size is less than 10% compared to initial condition
B: Change in the particle size is 10% or higher but less than 30% compared to initial condition
C: Change in the particle size is 30% or higher compared to initial condition

TABLE 4

|  | Particle size (initial)/nm | Particle size (after storage)/nm | Change in Particle Size (%) | Judgment |
| --- | --- | --- | --- | --- |
| Y1 | 91 | 95 | 4.40% | A |
| Y2 | 102 | 122 | 19.60% | B |
| Y3 | 95 | 118 | 24.20% | B |
| Y4 | 112 | 109 | 2.70% | A |
| Y5 | 108 | 123 | 13.90% | B |
| Y6 | 95 | 102 | 7.36% | A |
| Y7 | 121 | 118 | 2.48% | A |
| Y8 | 117 | 126 | 7.69% | A |

(4) Overall Evaluation

The ranking of the evaluations 1 through 3 were expressed as points in order to quantitatively clarifies the effect of the embodiments based on the aforementioned evaluations 1 through 3, and then an overall evaluation score was determined by multiplying these values. Points were assigned based on the rankings as shown below. A product of all of the evaluation points was taken as the overall evaluation score because it was determined that if even one C was assigned, the necessary function of the invention was not achieved. The results are shown in Table 5.

A: 3 points
B: 1 point
C: 0 points

TABLE 5

|  | (1) Light fastness | | (2) Chromaticity (Chroma) | | | (3) Storage Stability | Evaluation Score |
| --- | --- | --- | --- | --- | --- | --- | --- |
|  | 400 hours | 600 hours | Yellow | Red | Green | | |
| Y1 | A | A | A | B | A | A | 243 |
|  | 3 | 3 | 3 | 1 | 3 | 3 | |
| Y2 | A | B | A | A | A | B | 81 |
|  | 3 | 1 | 3 | 3 | 3 | 1 | |
| Y3 | A | B | A | B | A | B | 27 |
|  | 3 | 1 | 3 | 1 | 3 | 1 | |
| Y4 | B | C | A | A | A | A | 0 |
|  | 1 | 0 | 3 | 3 | 3 | 3 | |
| Y5 | A | A | B | B | B | B | 9 |
|  | 3 | 3 | 1 | 1 | 1 | 1 | |
| Y6 | A | B | B | B | B | A | 9 |
|  | 3 | 1 | 1 | 1 | 1 | 3 | |
| Y7 | A | A | A | A | C | A | 0 |
|  | 3 | 3 | 3 | 3 | 0 | 3 | |
| Y8 | A | A | C | C | B | A | 0 |
|  | 3 | 3 | 0 | 0 | 1 | 3 | |

From the above evaluation results, the ink composition of this embodiment was found to the overall superior compared to comparative examples with regards to light fastness, chromaticity, and storage stability. Furthermore, it was determined that for this embodiment, a yellow ink that used Pigment Yellow 213 was superior overall.

The invention claimed is:

1. An inkset for inkjet recording, comprising: a yellow ink composition; a cyan ink composition; a magenta ink composition; and a black ink composition, wherein the yellow ink composition contains C.I. Pigment Yellow 213, the cyan ink composition contains phthalocyanine pigment, the magenta ink composition contains quinacridone pigment, and the black ink composition contains carbon black.

2. The inkset according to claim 1, wherein the black ink composition comprises one or more types selected from the group consisting of a black ink composition in which the carbon black concentration is 1.5 wt % or higher, a black ink composition in which the carbon black concentration is less than 1.5 wt % and 0.6 wt % or higher, and a black ink composition in which the carbon black concentration is less than 0.6 wt %.

3. An inkjet recording method, comprising: discharging droplets of the inkset according to claim 1; and causing the droplets to adhere to a recording medium for printing.

4. A recorded matter, printed with the inkjet recording method according to claim 3.

5. An inkjet recording method, comprising: discharging droplets of the inkset according to claim 2; and causing the droplets to adhere to a recording medium for printing.

6. A recorded matter, printed with the inkjet recording method according to claim 5.

* * * * *